United States Patent
Park

(10) Patent No.: US 8,208,733 B2
(45) Date of Patent: Jun. 26, 2012

(54) METHOD, MEDIUM, AND APPARATUS WITH ESTIMATION OF BACKGROUND CHANGE

(75) Inventor: Tae-suh Park, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1170 days.

(21) Appl. No.: 12/007,981

(22) Filed: Jan. 17, 2008

(65) Prior Publication Data

US 2009/0041359 A1    Feb. 12, 2009

(30) Foreign Application Priority Data

Aug. 8, 2007    (KR) .................. 10-2007-0079783

(51) Int. Cl.
*G06K 9/48* (2006.01)
*G06K 9/68* (2006.01)

(52) U.S. Cl. ....................... 382/199; 382/218

(58) Field of Classification Search .................. 382/107, 382/181, 190, 199, 218, 236
See application file for complete search history.

(56) References Cited

U.S. PATENT DOCUMENTS

| | | | | |
|---|---|---|---|---|
| 6,661,918 B1 * | 12/2003 | Gordon et al. | ................ | 382/173 |
| 6,678,413 B1 * | 1/2004 | Liang et al. | ................... | 382/181 |
| 7,068,842 B2 * | 6/2006 | Liang et al. | ................... | 382/181 |
| 7,095,401 B2 * | 8/2006 | Liu et al. | ......................... | 345/156 |
| 7,720,283 B2 * | 5/2010 | Sun et al. | ....................... | 382/173 |
| 7,756,295 B2 * | 7/2010 | Yokoi | ............................ | 382/103 |
| 2007/0116356 A1 * | 5/2007 | Gong et al. | .................... | 382/173 |

* cited by examiner

*Primary Examiner* — Daniel Mariam
(74) *Attorney, Agent, or Firm* — Staas & Halsey LLP

(57) ABSTRACT

A method, medium, and apparatus with estimation of background changes. The method includes generating an edge map based on a pre-learned background image, and calculating a value representing the similarity between a foreground image extracted from an input image and the generated edge map and estimating a background change in the input image based on the calculated value. Therefore, the method can reduce the effect of disturbances caused by the implementation environment of an image-based intrusion detection system and uncontrollable device defects, which, in turn, reduces false alarms.

20 Claims, 9 Drawing Sheets

METHOD, MEDIUM, AND APPARATUS WITH ESTIMATION OF BACKGROUND CHANGE

CROSS-REFERENCE TO RELATED APPLICATIONS

This application claims the priority of Korean Patent Application No. 10-2007-0079783, filed on Aug. 8, 2007, in the Korean Intellectual Property Office, the disclosure of which is incorporated herein in its entirety by reference.

BACKGROUND

1. Field

One or more embodiments of the present invention relate to a motion detection system, and more particularly, to a method, medium, and apparatus with estimation of a background change, such as included in a motion detection system, using a background model.

2. Description of the Related Art

Recently, as we become more aware of new threats such as terrorism or crimes by inner staff, visual surveillance and security systems are gradually being introduced within society, outside of their previous limited applications within non-civilian military or law enforcement facilities. In addition, the need for automation of intrusion detection using video cameras is also increasing due to expansions of monitoring areas, increased labor costs of monitoring staff, and attention deficits and distractions affecting monitoring staff, as proven through psychological experiments. Accordingly, visual-based intrusion detection products detecting motion, a widely known basic and important cue for detecting intrusion, have started to be introduced.

Motion detection techniques are generally classified into 3 groups, that is, a background subtraction-based motion detection technique using a statistical background model, a temporal difference-based motion detection technique, and an optic flow-based motion detection technique.

These three motion detection techniques have their own advantages and disadvantages. However, it is known that, when various characteristics are taken into consideration, such a background subtraction-based motion detection technique using a mixture of Gaussian models is more robust to noise and, in general, has a better detection performance than the other techniques. Hence, the background subtraction-based motion detection technique is widely used in intrusion detection systems.

The background subtraction-based motion detection technique is based on the assumption that a background remains unchanged for a long time when it is photographed by a fixed camera. Therefore, if the entire background changes due to the shaking of a camera, a motion detector applying the technique falsely recognizes a change in background as movements in the foreground. Accordingly, the conventional background subtraction-based motion detection technique cannot accurately detect a real moving object until the entire background has been relearned. That is, to recover from this malfunction, or mischaracterization, the motion detector needs to reset the prior background model and reorganize the model by relearning the background as soon as possible. In this case, a corresponding learning rate greatly affects the recovery time. For example, when the learning rate is set low, the motion detector cannot cope with periodic vibrations of a camera caused by intermittent strong winds, for example, and thereby can be stuck in a vicious cycle of endless relearning. If the learning rate is set high, these problems may be eased, but an object moving slowly in the foreground would not be distinguished as the foreground, but falsely learned to be a part of the background.

These disturbances may not only be caused by strong winds, but also by other factors such as trains running on railroads and subways, or cargo trucks on a nearby highway, which can be frequently found in densely populated urban areas. Therefore, although the conventional statistical background subtraction-based motion detection technique has, by its nature, a superior detection performance, the technique is not that reliable in many outdoor applications, especially in urban areas, because the increased frequency in false alarms deteriorates the value of automated intrusion detection.

SUMMARY

One or more embodiments of the present invention provides a method, medium, and apparatus with estimation of a background change, the method, medium, and apparatus capable of detecting damage to a background model which may be caused by motion of a camera itself in a background learning-based moving object detection system and quickly handling the damage.

One or more embodiments of the present invention also provides a motion detection method, medium, and apparatus that can reduce false alarms and enhance reliability by performing motion detection based on background change estimation and thus minimizing the effect of disturbances in an intrusion detection system using an image monitoring camera.

Additional aspects and/or advantages will be set forth in part in the description which follows and, in part, will be apparent from the description, or may be learned by practice of the invention.

According to an aspect of the present invention, there is provided a method of estimating a background change. The method includes generating an edge map based on a pre-learned background image, and calculating a value representing the similarity between a foreground image extracted from an input image and the generated edge map and estimating a background change in the input image based on the calculated value.

According to another aspect of the present invention, there is provided an apparatus for estimating a background change. The apparatus includes an edge map generation unit generating an edge map based on a pre-learned background image, and a background change estimation unit calculating a value representing the similarity between a foreground image extracted from an input image and the generated edge map and estimating a background change in the input image based on the calculated value.

According to another aspect of the present invention, there is provided a motion detection method including generating a background image from an input image using a predetermined learning method, generating an edge map based on the learned background image, extracting a foreground image by subtracting the learned background image from the input image, calculating a value representing the similarity between the extracted foreground image and the generated edge map and estimating a background change in the input image based on the calculated value, and detecting motion of an object in the input image based on the extracted foreground image and the estimation result.

According to another aspect of the present invention, there is provided a motion detection apparatus including a background update unit generating a background image from an input image using a predetermined learning method, an edge map generation unit generating an edge map based on the learned background image, a foreground extraction unit extracting a foreground image by subtracting the learned background image from the input image, a background change estimation unit calculating a value representing the similarity between the extracted foreground image and the generated edge map and estimating a background change in the input image based on the calculated value, and a motion detection unit detecting motion of an object in the input image based on the extracted foreground image and the estimation result.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF EMBODIMENTS

Figure 1:
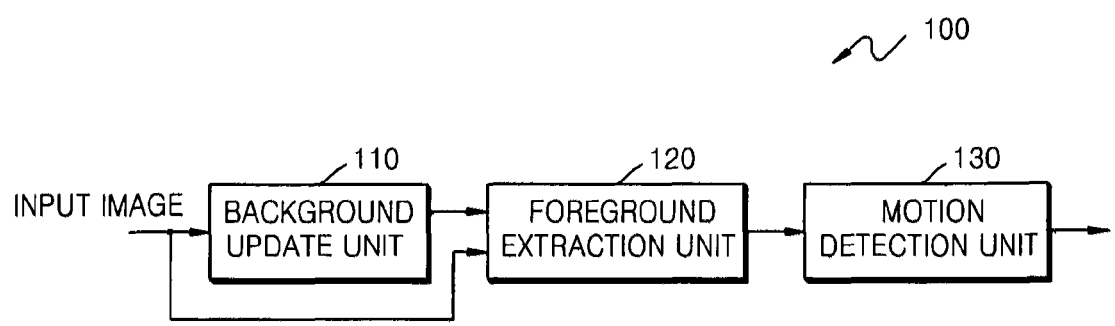
FIG. 1 illustrates a conventional motion detection apparatus using a background model.

Reference will now be made in detail to embodiments, examples of which are illustrated in the accompanying drawings, wherein like reference numerals refer to like elements throughout. In this regard, embodiments of the present invention may be embodied in many different forms and should not be construed as being limited to embodiments set forth herein. Accordingly, embodiments are merely described below, by referring to the figures, to explain aspects of the present invention.

FIG. 1 illustrates a conventional motion detection apparatus 100 using a background model.

Referring to FIG. 1, the conventional motion detection apparatus 100 includes a background update unit 110, a foreground extraction unit 120, and a motion detection unit 130.

The conventional motion detection apparatus 100 learns the background of an input image using a statistical learning method such as a mixture of Gaussian model-based learning techniques, extracts a foreground area by subtracting a learned background image from the input image, and detects motion of an object by interpreting the foreground area.

Figure 2A:
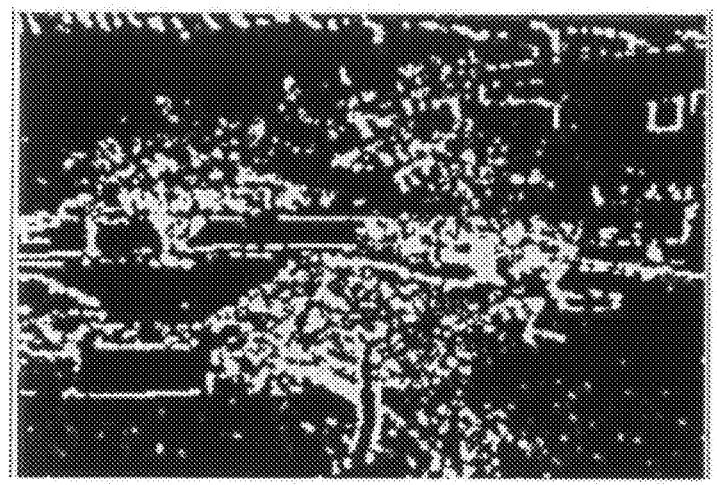
FIGS. 2A and 2B are illustrations explaining conventional false alarms caused by the shaking of a camera.
Figure 2B:
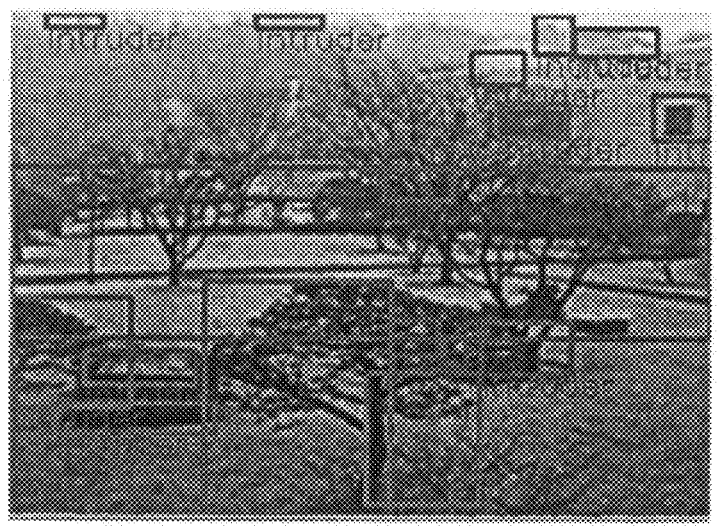

FIGS. 2A and 2B are illustrations explaining conventional false alarms caused by the shaking of a camera. Specifically, FIG. 2A illustrates a resultant difference image in the case where the background in a monitoring area is perceived as the foreground after it has changed due to slight shaking of the camera caused by a strong wind. FIG. 2B illustrates a resultant intruder designation image in the case where falsely detected foreground areas are perceived as real motions, resulting in the plural generated false alarms.

Figure 3A:
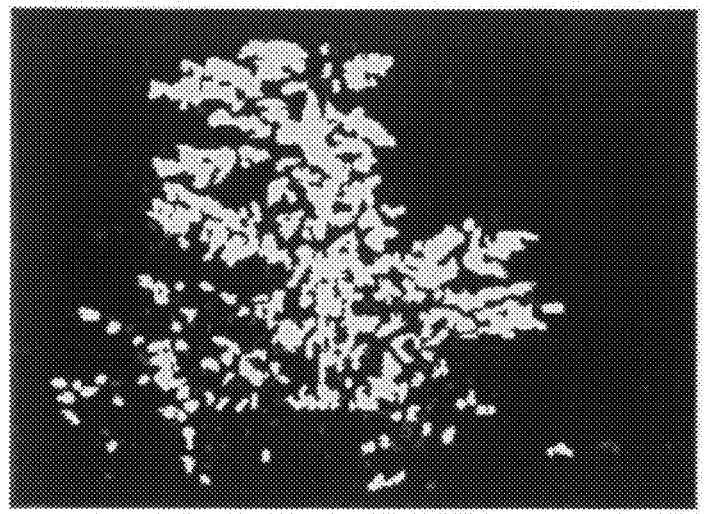
FIGS. 3A and 3B are illustrations explaining conventional false alarms caused by motion of an unimportant object in the background.
Figure 3B:
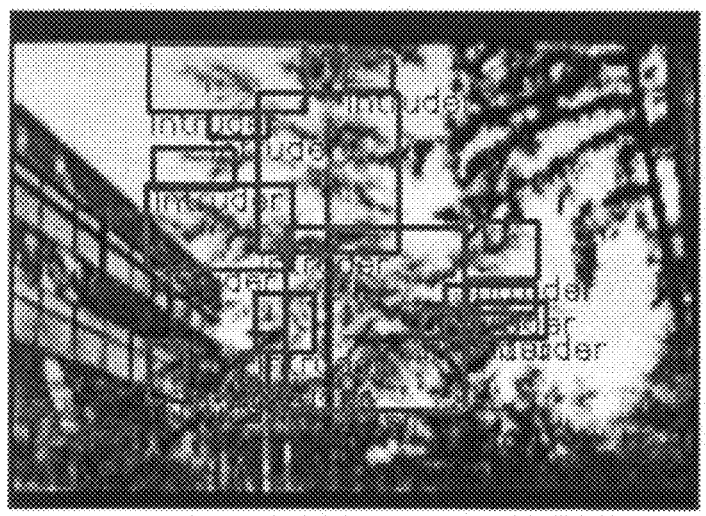

FIGS. 3A and 3B are illustrations explaining conventional false alarms caused by motion of an unimportant object in the background Specifically, FIG. 3A illustrates a resultant difference image in the case where a static tree, which originally belonged to the background, is perceived as the foreground after it has been temporarily shaken. FIG. 3B illustrates a resultant intruder designation image showing the case where plural false alarms are generated due to this misperception. Unlike the problem caused by the shaking of the camera and shown in FIGS. 2A and 2B, the problem shown in FIGS. 3A and 3B can typically be overcome over time as the background is relearned. However, it takes time for the background to stabilize in the event of an unexpected motion, not periodic and constant motions. Meanwhile, moving body detection capability may deteriorate.

Figure 4:
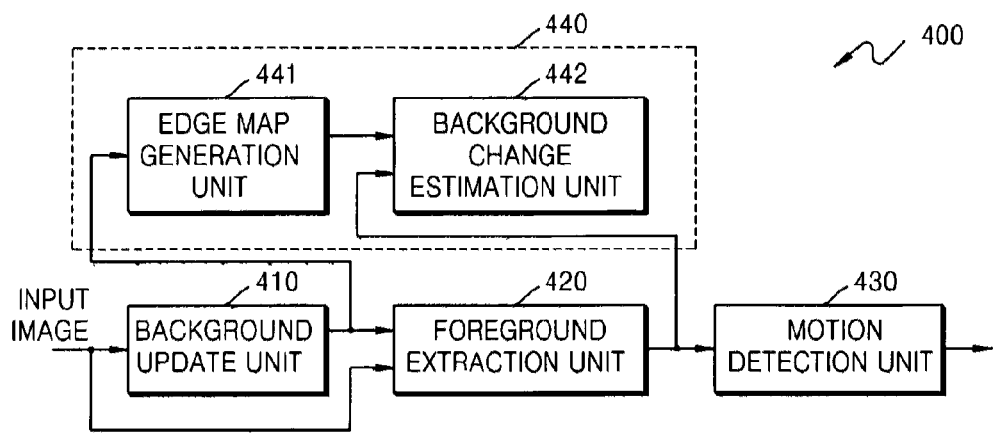
FIG. 4 illustrates a motion detection apparatus with background change estimation, such as with a background change estimation apparatus, according to an embodiment of the present invention.

FIG. 4 illustrates a motion detection apparatus 400, including a background change estimation apparatus 440, for example, according to an embodiment of the present invention. Herein, the term apparatus should be considered synonymous with the term system, and not limited to a single enclosure or all described elements embodied in single respective enclosures in all embodiments, but rather, depending on embodiment, is open to being embodied together or separately in differing enclosures and/or locations through differing elements, e.g., a respective apparatus/system could also be a single processing element or implemented through a distributed network, noting that additional and alternative embodiments are equally available.

Referring to FIG. 4, the motion detection apparatus 400 may include a background update unit 410, a foreground extraction unit 420, a motion detection unit 430, and the background change estimation apparatus 440, for example. In an embodiment, the background change estimation apparatus 440 may further include an edge map generation unit 441 and a background change estimation unit 442.

The background update unit 410 may generate a background model having probability values for pixel values of an image, obtained from each frame of an input moving image, using a statistical learning method such as the mixture of Gaussian models. In addition, the background update unit 410 may receive a result of this motion detection and update the background model accordingly. The mixture of Gaussian models is a background model that can learn the background by adaptively reflecting external environmental changes. In this case, the external environmental changes include changes in lighting condition, repeated motions such as shaking of trees, and rapidly moving objects.

Though the mixture of Gaussian models has been described above in an example, embodiments of the present invention are not limited to the same. Additional and/or other background learning algorithms may also be used, for example.

The foreground extraction unit 420 may subtract a background, e.g., as generated by the background update unit 410, from an image obtained from each frame of the input moving image, for example, and extract a difference image, as a result of the subtraction, as a foreground.

The motion detection unit 430 may further interpret the foreground, e.g., as extracted by the foreground extraction unit 420, filter out minor noises based on various parameters, such as the size, shape, or energy of a foreground image, and detect motion of an object. In addition, the motion detection unit 430 may detect motion of an input image by reflecting on the estimation result of the background change estimation apparatus 440.

The background change estimation apparatus 440 may generate an edge map, e.g., based on a background image learned by the background update unit 410, calculate a value representing the similarity between a foreground image extracted by the foreground extraction unit 420 and the generated edge map, and estimate a background change in the input image based on the example calculated value. In this case, the background change denotes a change in the background caused by potentially non-intruder related disturbances, such as shaking of a camera, and motions of objects other than an object of interest, for example, shaking of branches.

The edge map generation unit 441 may identify areas having a sufficiently large number of edges, e.g., based upon predetermined thresholds, in an image obtained whenever the background update unit 410 initializes the background and generates an edge map.

In this embodiment, in consideration of the foreground extracted by the foreground extraction unit 420 and the edge map generated by the edge map generation unit 441, the background change estimation unit 442 may examine whether distribution of pixels that form the foreground extracted by the foreground extraction unit 420 is similar to that of edge areas of the edge map generated by the edge map generation unit 441. If they are similar, the background change estimation unit 442 may determine that the foreground obtained from a current frame does not reflect a difference from the background caused by motion of a real object but reflects a change of the background itself in a monitoring area caused by a change in the position of a camera.

In addition, if the example value representing this similarity is low in the entire area but high in some areas of the input image, the background change estimation unit 442 may determine that the background in a corresponding area has changed due to, for example, shaking of branches. Here, though the similarity value has been described, alternate embodiments for distinguishing similarities are also available.

Figure 5:
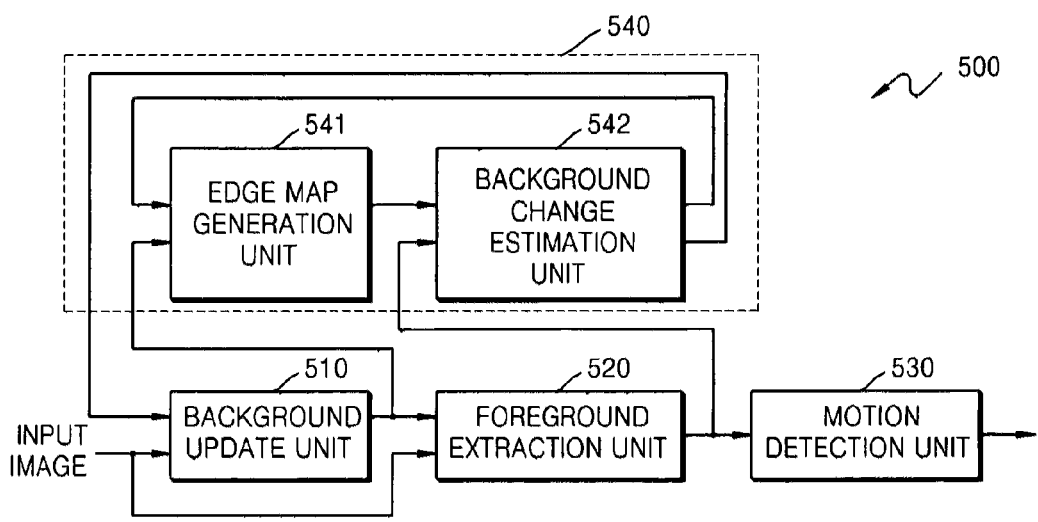
FIG. 5 illustrates a motion detection apparatus with background change estimation, such as with a background change estimation apparatus, according to another embodiment of the present invention.

FIG. 5 illustrates a motion detection apparatus 500, including a background change estimation apparatus 540, for example, according to an embodiment of the present invention.

Referring to FIG. 5, the motion detection apparatus 500 can be different from the motion detection apparatus 400 of FIG. 4 in that the estimation result of a background change estimation unit 542 is fed back to a background update unit 510 and an edge map generation unit 541, for example, and reflected accordingly.

The background change estimation unit 542 may generate an edge map based on a learned background image and calculate an example value representing the similarity between a foreground image extracted from an input image and the generated edge map. If the foreground image and the generated edge map are similar, the background change estimation unit 542 may determine that a foreground obtained from a current frame does not reflect a sufficient difference from the background caused by motion of a real object but reflects a change of the background itself in a monitoring area caused by a change in the position of a camera, e.g., for certain reasons. If it is determined that a foreground has been generated due to a position change of the camera, the background change estimation unit 542 may control the background update unit 510 to relearn the background at a sufficiently higher learning rate than an average learning rate, for example. In addition, if it is determined that the background has sufficiently stabilized, the background change estimation unit 542 may further control the edge map generation unit 541 to regenerate an edge map according to a changed background.

Figure 6A:
FIGS. 6A through 6C are illustrations explaining a process of generating an edge map, such as by using edge map generation units illustrated in FIGS. 5 and 6.
Figure 6B:
Figure 6C:
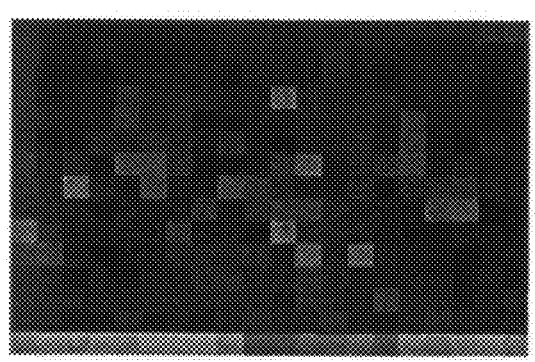

FIGS. 6A through 6C are illustrations explaining a process of generating an edge map, such as through using the edge map generation units 441 and 541 illustrated in FIGS. 5 and 6, for example.

Specifically, FIG. 6A illustrates an original image with a specified background, and FIG. 6B shows an edge image of the original image. In this case, an edge denotes an area where there is a sufficiently large brightness difference between adjacent pixels in an image. That is, an edge indicates a boundary of an object in an image and contains various important information required to detect shape and direction. A similarity operator technique or a difference operator technique may be used as an edge extraction technique and will not be described in further detail since, noting that additional edge determination techniques may further be available.

FIG. 6C illustrates an image of an edge map generated using the extracted edge image of FIG. 6B. Here, boundary value processing has been performed on the extracted edge image in order to make a strong edge stronger and a weak edge weaker. The boundary value processing may be performed using a single boundary value or a multi-boundary value. Thus, through this boundary value processing, an edge map as illustrated in FIG. 6C can be generated.

Figure 7:
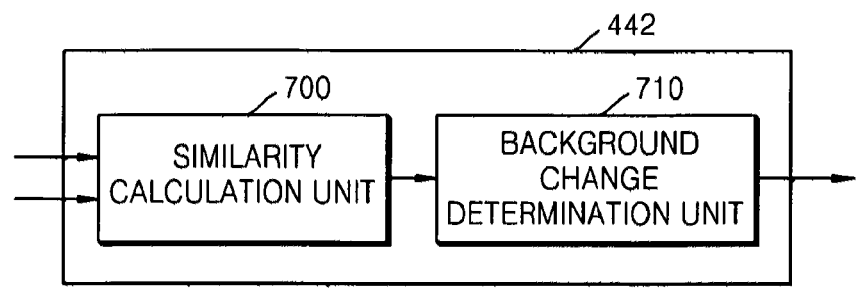
FIG. 7 illustrates a background change estimation unit, such as the background change estimation unit illustrated in FIG. 4, according to an embodiment of the present invention.

FIG. 7 illustrates a background change estimation unit 442, such as illustrated in FIG. 4, as only an example, according to an embodiment of the present invention.

Referring to FIG. 7, the background change estimation unit 442 may include a similarity calculation unit 700 and a background change determination unit 710, for example.

The similarity calculation unit 700 may compare distribution of areas of a foreground image extracted by subtracting a learned background image from an input image to that of edge areas in a generated edge map and thus calculate a value representing the similarity between them.

The background change determination unit 710 may determine whether the value representing the similarity calculated by the similarity calculation unit 700, for example, exceeds a predetermined threshold value. If the value exceeds the predetermined threshold value, the background change determination unit 710 may estimate that the background of the input image has changed. That is, in an embodiment, the background change determination unit 710 estimates that the foreground obtained from a current frame does not reflect a difference from the background caused by motion of a real object but reflects a change of the background itself in a monitoring area caused by motion of a camera due to, for example, disturbances.

Figure 8:
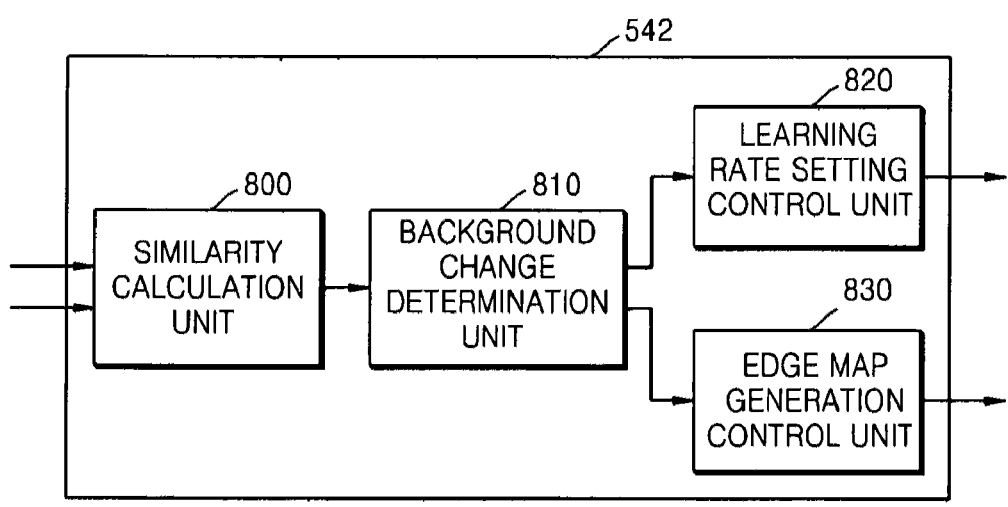
FIG. 8 illustrates another background change estimation, such as the background change estimation unit illustrated in FIG. 5, according to an embodiment of the present invention.

FIG. 8 illustrates a background change estimation unit 542, such as illustrated in FIG. 5, as only an example, according to an embodiment of the present invention.

Referring to FIG. 8, the background change estimation unit 542 may be different from the background change estimation unit 442 illustrated in FIG. 7, for example, in that it may include elements desired to control an entire operation of the motion detection apparatus 500, for example, by reflecting an estimation result in the background update unit 510 and the edge map generation unit 541.

The background change estimation unit 542 may include a similarity calculation unit 800, a background change determination unit 810, a learning rate setting control unit 820, and an edge map generation control unit 830, for example.

In an embodiment, the similarity calculation unit 800 and the background change determination unit 810 may be identical to the similarity calculation unit 700 and the background change determination unit 710 of FIG. 7. The learning rate setting control unit 820 may control the background update unit 510 to update a background image at a reset learning rate based on the estimation result of the background change determination unit 810. That is, if it is determined that the distribution of foreground image areas and that of edge areas in an edge map are sufficiently similar, the learning rate setting control unit 820 may instruct the background update unit 510 to increase a current background learning rate to a higher rate. As noted above, by increasing the background learning rate, the speed at which the motion detection apparatus 500 adapts to unexpected disturbances can be enhanced.

The edge map generation control unit 830 may control the edge map generation unit 541 to generate an edge map of a background image learned at a reset learning rate. That is, when determining that the background image has been sufficiently learned in a stable manner, the edge map generation unit 830 may restore the reset learning rate to an original default value and control the edge map generation unit 541 to generate a new edge map for the changed background.

Figure 9:
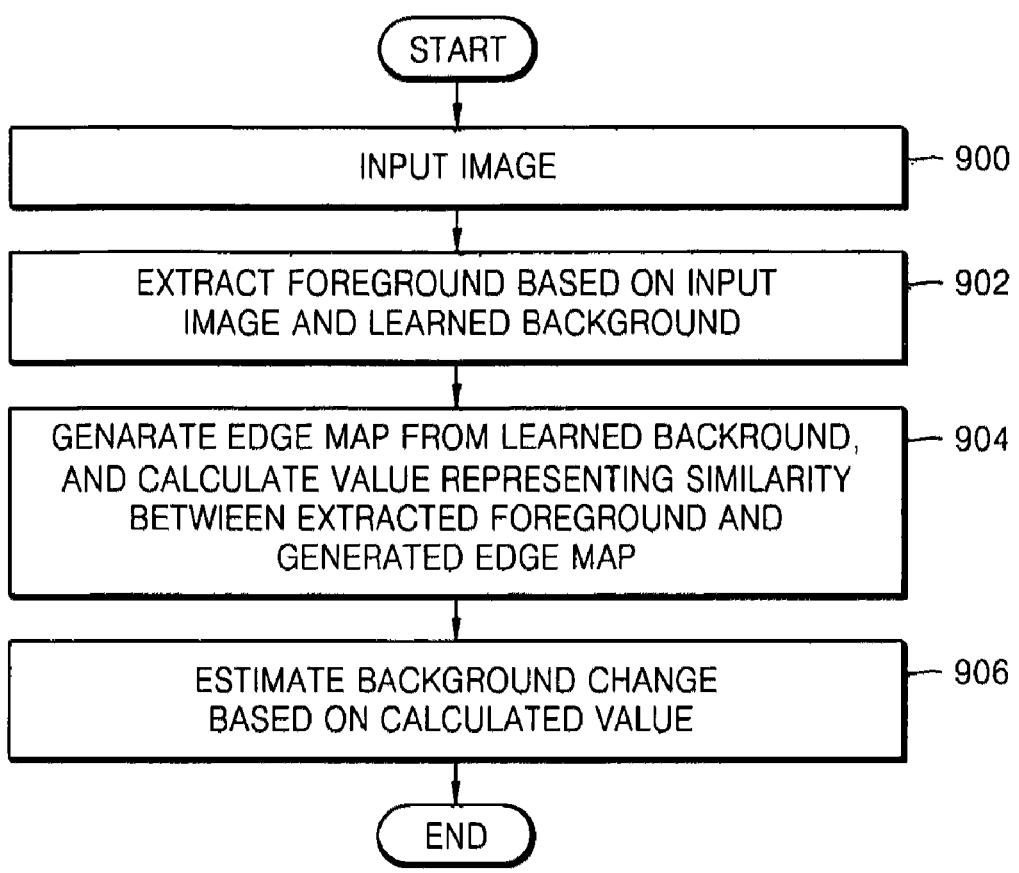
FIG. 9 illustrates a method of estimating a background change, according to an embodiment of the present invention.

FIG. 9 illustrates a method of estimating a background change, according to an embodiment of the present invention.

Referring to FIG. 9, in operation 900, an image may be input. In operation 902, foreground areas may be extracted by subtracting a learned background image from the input image, for example. In operation 904, an edge map may further be generated from the learned background image, and an example value representing the similarity between the distribution of the foreground areas extracted in operation 902 and that of edge areas of the generated edge map may be calculated. In operation 906, it may still further be estimated whether a background change has occurred based on the calculation result of the value representing the similarity. That is, in such an example embodiment, if the value representing the similarity is high, it is estimated that the background change has occurred due to motion of a camera caused by disturbances.

Figure 10:
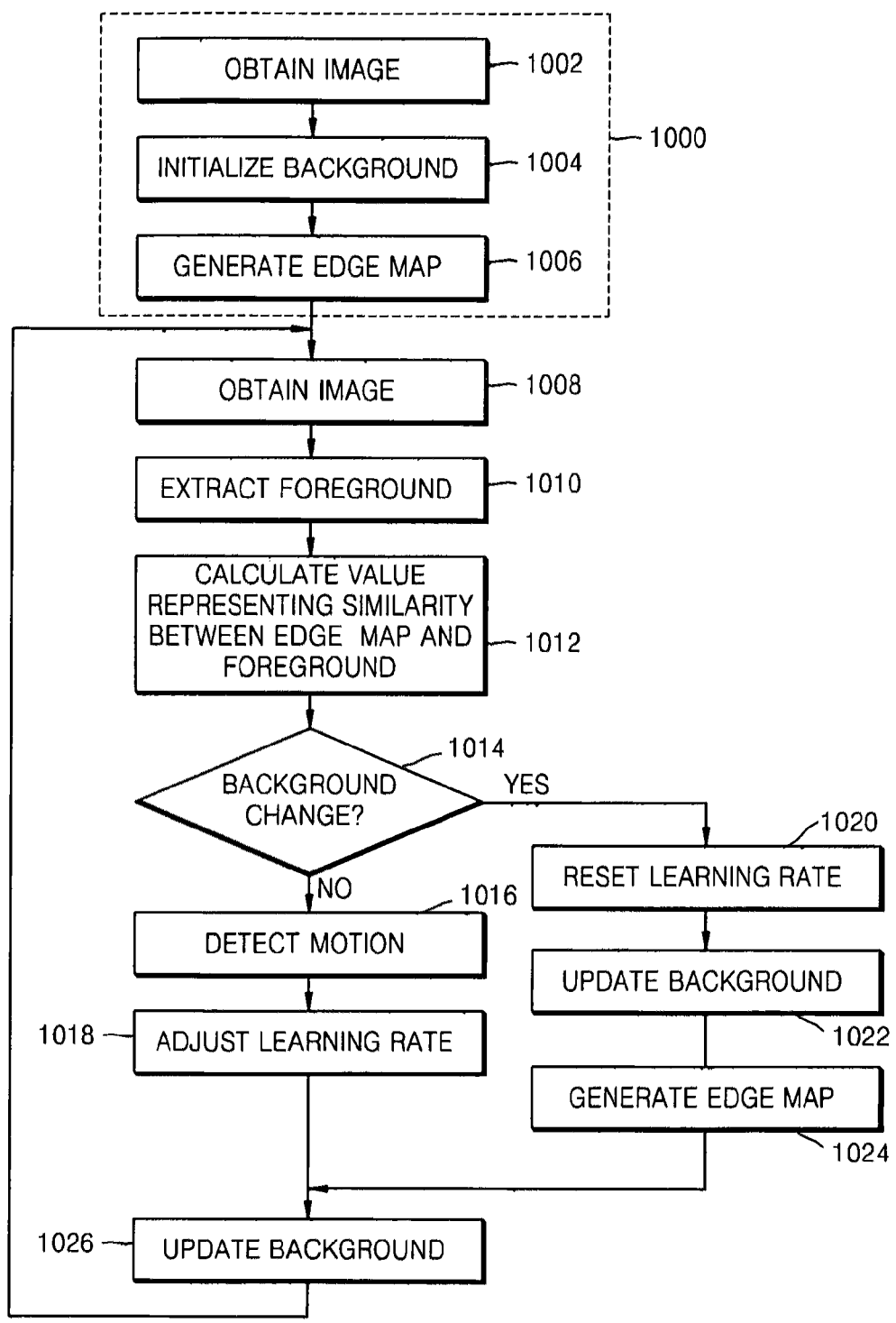
FIG. 10 illustrates a motion detection method using a background model, according to an embodiment of the present invention.

FIG. 10 illustrates a motion detection method using a background model, according to an embodiment of the present invention.

Referring to FIG. 10, in operation 1000, a motion detection apparatus may be initialized. In such a case, operation 1000 for initialization of the motion detection apparatus can include operation 1002 in which an image is obtained, operation 1004 in which a background image is initialized by learning the background image in the obtained image using a statistical background model, and operation 1006 in which an edge map is generated using the initialized background image, for example.

In operation 1008, an image may be obtained. In operation 1010, the above background image, for example, may be subtracted from the obtained image to extract foreground areas. In operation 1012, an example value representing the similarity between the distribution of edge areas in the edge map generated in operation 1000 and that of the extracted foreground areas may be calculated. In operation 1014, it may be determined whether a background change has occurred based on whether the calculated value representing the similarity exceeds a predetermined threshold value, for example. In such an embodiment, the threshold value may be a reference value predetermined to compare the value representing the similarity. If the value representing the similarity is less than the predetermined threshold value, or fails to meet the threshold, operation 1016 is performed. That is, an object is extracted from the extracted foreground areas and thus the motion of the object is detected. In operation 1018, a learning rate may be restored to a predetermined default value. On the other hand, if the value representing the similarity exceeds the predetermined threshold value, or meets the threshold, it is estimated that the background change has occurred due to, for example, motion of a camera. Accordingly, operation 1020 is performed. That is, the background learning rate may be reset to a higher rate. In operation 1022, the background is learned at a higher learning rate and updated accordingly. In operation 1024, an edge map of the learned background is regenerated. In operation 1026, in an embodiment, after the background is updated, operation 1008 is performed again. That is, motion detection is performed on a frame of the obtained image.

Figure 11A:
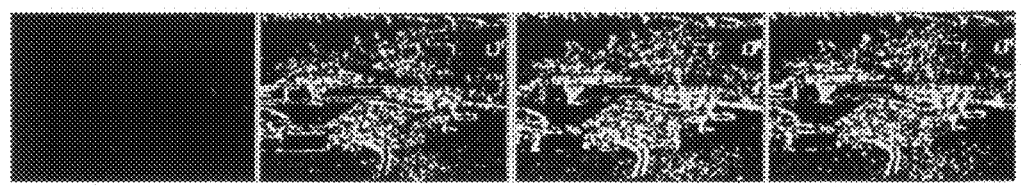
FIGS. 11A and 11B are illustrations explaining examples of applying motion detection apparatuses using a background model, according to an embodiment of the present invention.
Figure 11B:
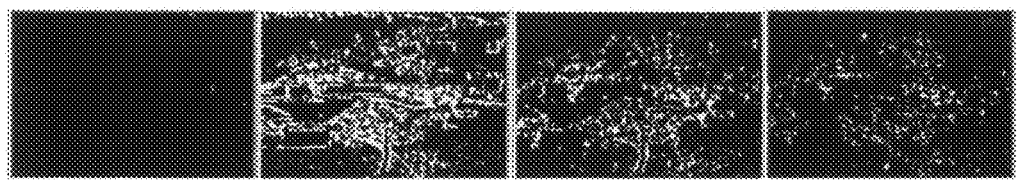

FIGS. 11A and 11B are illustrations explaining examples of an applying of motion detection apparatuses using a background model according to an embodiment of the present invention. In each of FIGS. 11A and 11B, a 480th frame, a 500th frame, a 520th frame, and a 541st frame based on a horizontal axis are serially illustrated left to right.

Specifically, FIG. 11A shows an example of applying a conventional motion detection apparatus. Referring to FIG. 11A, it can be understood that a background changed by a disturbance was perceived as a foreground. Although the device may have tried to relearn the background over time, there is difficulty in relearning the background even after a period of time since the corresponding learning rate is set low in order to capture an intruder who appears to be moving slowly when viewed from a long distance. Such a conventional motion detection apparatus is more vulnerable to period disturbances such as vibrations of the subway, for example, and thus fails to secure sufficient time to recognize the fixed background.

FIG. 11B illustrates an example of an applying of a motion detection apparatus according to an embodiment of the present invention. Referring to FIG. 11, a motion detection apparatus, according to an embodiment of the present invention, significantly increases the learning rate at the very moment when it perceives shaking of a camera. Therefore, areas recognized as foreground areas can be minimized or reduced to almost zero over time.

According to one or more embodiments of the present invention, a method of estimating a background change generates an edge map based on a learned background image, calculates a value representing the similarity between a foreground image extracted from an input image and the edge map, and estimates a background change in the input image based on the calculated value. In so doing, the effect of disturbances caused by the environment of a visual-based intrusion detection system and uncontrollable device defects can be minimized, which, in turn, reduces false alarms.

In addition, reliability of intrusion detection systems can be enhanced, and, accordingly, labor costs of monitoring human resources can be reduced. Further, since such an intrusion detection system can be applied to places where traditional visual-based intrusion detection systems have been not used due to intermittent disturbances, it is expected to have merit in applicability coping with such various environmental factors.

In addition to the above described embodiments, embodiments of the present invention can also be implemented through computer readable code/instructions in/on a medium, e.g., a computer readable recording medium, to control at least one processing element to implement any above described embodiment. The medium can correspond to any medium/media permitting the storing and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as media carrying or including carrier waves, as well as elements of the Internet, for example. Thus, the medium may be such a defined and measurable structure including or carrying a signal or information, such as a device carrying a bitstream, for example, according to embodiments of the present invention. The media may also be a distributed network, so that the computer readable code is stored/transferred and executed in a distributed fashion. Still further, as only an example, the processing element could include a processor or a computer processor, and processing elements may be distributed and/or included in a single device.

While aspects of the present invention has been particularly shown and described with reference to differing embodiments thereof, it should be understood that these exemplary embodiments should be considered in a descriptive sense only and not for purposes of limitation. Further, descriptions of features or aspects within each embodiment should typically be considered as available for other similar features or aspects in the remaining embodiments.

Thus, although a few embodiments have been shown and described, it would be appreciated by those skilled in the art that changes may be made in these embodiments without departing from the principles and spirit of the invention, the scope of which is defined in the claims and their equivalents.

What is claimed is:

1. A method of estimating a background change, the method comprising:
   generating an edge map based on a pre-learned background image; and
   calculating, using at least one processor, a value representing the similarity between a foreground image extracted from an input image and the generated edge map and estimating a background change in the input image based on the calculated value.

2. The method of claim 1, wherein a learning rate of the background image is reset based on the estimation result.

3. The method of claim 1, wherein the estimating of the background change comprises:
   calculating the value representing the similarity between the extracted foreground image and the generated edge map by comparing distribution of areas of the foreground image extracted by subtracting the pre-learned background image from the input image to that of edge areas of the generated edge map; and
   estimating that a background of the input image has changed if the value representing the similarity between the extracted foreground image and the generated edge map exceeds a predetermined threshold.

4. The method of claim 1, wherein the estimating of the background change further comprises controlling the learning rate of the background image.

5. The method of claim 4, wherein the estimating of the background change further comprises generating an edge map of the background image which is relearned at the reset learning rate.

6. The method of claim 1, wherein, if the background image is learned and thus initialized, the edge map is generated from the background image based on areas having edge components.

7. A non-transitory recording medium on which a program for executing the method of claim 1 using a computer is recorded.

8. An apparatus for estimating a background change, the apparatus comprising:
   an edge map generation unit to generate an edge map based on a pre-learned background image; and
   a background change estimation unit to calculate a value representing the similarity between a foreground image extracted from an input image and the generated edge map and to estimate a background change in the input image based on the calculated value.

9. The apparatus of claim 8, wherein a learning rate of the background image is reset based on the estimation result.

10. The apparatus of claim 8, wherein the background change estimation unit comprises:
    a similarity calculation unit to calculate the value representing the similarity between the extracted foreground image and the generated edge map by comparing distribution of areas of the foreground image extracted by subtracting the pre-learned background image from the input image to that of edge areas of the generated edge map; and
    a background change determination unit to determine that a background of the input image has changed if the value representing the similarity between the extracted foreground image and the generated edge map exceeds a predetermined threshold value.

11. The apparatus of claim 8, wherein the background change estimation unit further comprises a learning rate control unit to reset the learning rate of the background image.

12. The apparatus of claim 11, wherein the background change estimation unit further comprises an edge map generation control unit to generate an edge map of the background image learned at the reset learning rate.

13. The apparatus of claim 8, wherein, if the background image is learned and thus initialized, the edge map generation unit generates the edge map from the background image based on areas having edge components.

14. A method of motion detection comprising:
    generating a background image from an input image using a predetermined learning method;
    generating an edge map based on the learned background image;
    extracting a foreground image by subtracting the learned background image from the input image;
    calculating, using at least one processor, a value representing the similarity between the extracted foreground image and the generated edge map and estimating a background change in the input image based on the calculated value; and
    detecting motion of an object in the input image based on the extracted foreground image and the estimation result.

15. The method of claim 14, wherein a learning rate of the background image is reset based on the estimation result.

16. The method of claim 14, wherein the estimating of the background change comprises:
   calculating the value representing the similarity between the extracted foreground image and the generated edge map by comparing distribution of areas of the foreground image extracted by subtracting the learned background image from the input image to that of edge areas of the generated edge map;
   estimating that a background of the input image has changed if the value representing the similarity between the extracted foreground image and the generated edge map exceeds a predetermined threshold value; and
   controlling to reset the learning rate of the background image.

17. The method of claim 16, wherein the estimating of the background change further comprises controlling to generate an edge map of the background image learned at the reset learning rate.

18. An apparatus of motion detection comprising:
   a background update unit to generate a background image from an input image using a predetermined learning method;
   an edge map generation unit to generate an edge map based on the learned background image;
   a foreground extraction unit to extract a foreground image by subtracting the learned background image from the input image;
   a background change estimation unit to calculate a value representing the similarity between the extracted foreground image and the generated edge map and to estimate a background change in the input image based on the calculated value; and
   a motion detection unit to detect motion of an object in the input image based on the extracted foreground image and the estimation result.

19. The apparatus of claim 18, wherein the background change estimation unit comprises:
   a similarity calculation unit to calculate the value representing the similarity between the extracted foreground image and the generated edge map by comparing distribution of areas of the foreground image extracted by subtracting the learned background image from the input image to that of edge areas of the generated edge map; and
   a background change determination unit to estimate that a background of the input image has changed if the value representing the similarity between the extracted foreground image and the generated edge map exceeds a predetermined threshold value.

20. The apparatus of claim 19, wherein the background change estimation unit comprises:
   a learning rate setting control unit to control the background update unit to update the background image at the reset the learning rate according to the estimation result of the background change determination unit;
   an edge map generation control unit to control the edge map generation unit to generate an edge map of the background image learned at the reset learning rate.

* * * * *